3,260,693
POLYTETRAFLUOROETHYLENE DISPERSIONS
Mille Stand, Bronx, N.Y., assignor to Sealectro Corporation, Mamaroneck, N.Y.
No Drawing. Filed May 23, 1963, Ser. No. 282,556
1 Claim. (Cl. 260—30.4)

The invention relates to compositions of polytetrafluoroethylene in the form of solutions or dispersions which may be used, for example as lubricants or to coat surfaces with polytetrafluoroethylene.

The invention provides, in one of its aspects, a fluid composition comprising a solution or dispersion of polytetrafluoroethylene in a liquid medium which medium comprises a liquid, polar, fluoro-organic compound having a solubility parameter $\delta$ of less than 7, preferably from 5 to 7 and which can be evaporated to leave no residue at a temperature below the sintering temperature of polytetrafluoroethylene.

The solubility parameter $\delta$ is obtained from the equation $$\delta = \sqrt{\frac{\Delta E^V}{V}}$$

$\Delta E^V$ = energy of vaporisation of the pure solvent $V$ = molal volume or moles per 1,000 grams of solution $\frac{\Delta E^V}{V}$ = internal pressure or cohesive energy Preferably the liquid medium is one which readily evaporates at room temperature. For example the liquid preferably has a vapour pressure of at least 100 mm. at 20° C.

The liquid medium may comprise an oxygen-containing polyfluoro-organic compound. The polyfluoro compound may be a carboxylic acid such as monochlorodifluoro acetic acid; a ketone for example trichlorotrifluoro acetone or dichlorotetrafluoro acetone; an aldehyde, an alcohol.

The fluoro-organic compound may contain other halogens as well as fluorine in the molecule.

The liquid medium may include another organic liquid which acts as a diluent for the fluoro-organic compound. The diluent will be chemically inert to the fluoro-organic compound, and sufficiently volatile to permit evaporation to leave no residue at a temperature below the sintering temperature of polytetrafluoroethylene. Examples of liquid organic compounds which may be used as diluents are the chlorinated hydrocarbons for example trichloroethylene, carbon tetrachloride and hexachloroethane; ketones, e.g., methyl ethyl ketone or methyl isobutyl ketone; nitro alkanes, e.g., 2-nitro propane; dimethylformamide or tetrahydrofuran.

The dispersions may have a polytetrafluoroethylene content of from 5 to 90% and the polytetrafluoroethylene particles may have a size of up to 1000 microns, preferably with the major proportion of the particles in the range 100 to 500 microns.

Polytetrafluoroethylene produced by suspension polymerization wich has a particle size less than 10 microns may also be used but the stabilisers and dispersing agents must first be removed.

Compositions according to the invention are preferably non-aqueous.

The compositions of the invention may be used as lubricants, release agents in moulds, tanks, bins or chutes, or to coat surfaces, for example metal surfaces, with polytetrafluoroethylene and may be applied by spraying, allowing the liquid medium to evaporate. A convenient method of applying the composition is in the form of an aerosol. The liquid medium may comprise the propellant.

The invention, in another of its aspects, provides a method of coating a surface with polytetrafluoroethylene which method comprises applying to the surface a composition comprising a solution or dispersion of polytetrafluoroethylene in a liquid medium which medium comprises a liquid fluoro-organic compound having a solubility parameter $\delta$ of less than 7, preferably from 5 to 7 which medium can be evaporated to leave no residue at a temperature below the sintering temperature of polytetrafluoroethylene, and evaporating the liquid medium to form a coating of polytetrafluoroethylene on the surface.

The liquid medium may comprise a fluorocarbon for example perfluoro-butane, -pentane, -hexane, -heptane, -octane, or perfluorocyclohexane.

The composition which is applied to the surface may comprise one of the fluid compositions which comprises a solution or dispersion of polytetrafluoroethylene in a liquid medium comprising a liquid, polar, fluoro-organic compound as described above.

When the composition is applied to a surface which cannot be heated to the sintering temperature, the composition may be applied by propelling the dispersion through an electric arc, held a few inches from the surface. As the dispersion passes through the arc, the solvent is evaporated and the particles are melted. When the particles hit the surface, they coalesce to form a continuous film.

The surface may be a metal surface or a heat resistant surface, e.g., a ceramic surface. After application to such a surface and evaporation of the liquid medium the polytetrafluoroethylene may be sintered.

Metal surfaces may be pretreated to facilitate adhesion of the coating of polytetrafluoroethylene, for example, the surface may be scratched with a wire brush. The surface is cleaned prior to application of the polytetrafluoroethylene and may be pretreated with an aqueous solution of a salt of a transition metal, for example copper or nickel. Other metal salts which may be used are water soluble salts of iron, cobalt, manganese or chromium. The metal salt will be one capable of depositing its metal on the metal surface to be coated. It will be appreciated that a metal surface will not usually be pretreated with a salt of the same metal or in the case of an alloy such as stainless steel with a salt of one of the alloying metals.

The compositions which are applied to the surface may include one of the inert diluents previously mentioned.

The invention includes a method of lubricating two contacting surfaces which method comprises applying to the surfaces or one of them a polytetrafluoroethylene solution or dispersion as previously described.

Following is a description by way of example of methods of carrying the present invention into effect.

Example 1

The following composition was prepared:

| | Percent by weight |
|---|---|
| Polytetrafluoroethylene powder (average particle size 200 microns, and including particles up to 1000 microns) S.G. 2.1–2.3 | 17 |
| Trichlorotrifluoro acetone (C.Cl$_2$F.COCClF$_2$) | 10 |
| Trichloroethylene | 73 |

An aluminium sheet metal was dipped in a solution of copper nitrate, rinsed with water and dried. The composition was sprayed into the sheet and the liquid medium allowed to evaporate at room temperature. The sheet was then placed in an oven to sinter the coating of polytetrafluoroethylene. A continuous film of polytetrafluoroethylene having a thickness of 0.5 to 1.0 mil was produced. The temperature of sintering was about 400° C.

*Example 2*

The following composition was prepared:

| | Percent by weight |
|---|---|
| Polytetrafluoroethylene powder (average particle size 500 microns and including particles up to 1000 microns, S.G. 2.1–2.3) | 10 |
| Monochlorodifluoroacetic acid | 10 |
| Methyl ethyl ketone | 80 |

The composition was used to coat a ceramic surface with polytetrafluoroethylene. After evaporation of the liquid medium and sintering a continuous film of polytetrafluoroethylene was produced on the ceramic surface.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claim, and that all modifications that come within the meaning and range of equivalency of the claim are intended to be included therein.

I claim:

A fluid composition in the form of a dispersion of polytetrafluoroethylene in a liquid medium, which medium consists essentially of a mixture of
  (1) a liquid, polar fluoro-organic compound of a solubility parameter $\delta$ of from 5 to 7 and which can be evaporated to leave no residue at a temperature below the sintering temperature of polytetrafluoroethylene, said compound being selected from the group consisting of trichlorotrifluoroacetone, monochlorodifluoro acetic acid and dichlorotetrafluoroacetone, and
  (2) as a diluent an organic liquid selected from the group consisting of trichloroethylene, methyl ethyl ketone, methylisobutyl ketone, dimethylformamide, tetrahydrofuran, carbon tetrachloride and hexachloroethane.

References Cited by the Examiner

UNITED STATES PATENTS

| | | |
|---|---|---|
| 2,613,193 | 10/1952 | Osdal. |
| 2,630,417 | 3/1953 | Lontz _____ 260—31.2 |
| 2,662,831 | 12/1953 | Culverhouse _____ 117—50 |
| 2,876,206 | 3/1959 | Roselle _____ 260—31.2 |
| 2,914,500 | 11/1959 | Barnhart et al. |
| 2,915,552 | 12/1959 | Barnhart et al. |
| 3,010,843 | 11/1961 | Eder _____ 117—50 |

OTHER REFERENCES

Brenner et al., High-Temperature Plastics, Reinhold Publishing Corp., 1962, page 113.

Condensed Chemical Dictionary, 6th edition, Reinhold Publishing Corp., pages 260, 368 and 1162–1163.

Dupont, New Products Bulletin, "Teflon" Tetrafluoroethylene Resin Aqueous Dispersion TD–1, No. NX–10, page 3, 1952.

MORRIS LIEBMAN, *Primary Examiner.*

L. T. JACOBS, *Assistant Examiner.*